United States Patent
Aoki (10) Patent No.: US 9,251,389 B2
(45) Date of Patent: Feb. 2, 2016

(54) COMMUNICATION TERMINAL, COMPUTER-READABLE STORAGE MEDIUM, AND COMMUNICATION METHOD

(75) Inventor: Norihito Aoki, Rennes (FR)

(73) Assignee: CANON KABUSHIKI KAISHA, Tokyo (JP)

( * ) Notice: Subject to any disclaimer, the term of this patent is extended or adjusted under 35 U.S.C. 154(b) by 512 days.

(21) Appl. No.: 12/866,850

(22) PCT Filed: Mar. 31, 2009

(86) PCT No.: PCT/JP2009/057031
§ 371 (c)(1),
(2), (4) Date: Aug. 9, 2010

(87) PCT Pub. No.: WO2009/123340
PCT Pub. Date: Oct. 8, 2009

(65) Prior Publication Data
US 2010/0330906 A1    Dec. 30, 2010

(30) Foreign Application Priority Data
Apr. 4, 2008    (JP) .................. 2008-098751

(51) Int. Cl.
*H04B 5/00* (2006.01)
*G06K 7/10* (2006.01)
*H04B 1/59* (2006.01)

(52) U.S. Cl.
CPC ........ *G06K 7/10198* (2013.01); *G06K 7/10297* (2013.01); *H04B 1/59* (2013.01)

(58) Field of Classification Search
USPC ......... 455/41.1, 41.2, 552.1; 340/10.1, 10.33, 340/10.34; 710/63
See application file for complete search history.

(56) References Cited

U.S. PATENT DOCUMENTS

| | | | |
|---|---|---|---|
| 7,184,706 B2 | 2/2007 | Someya et al. | 455/41.2 |
| 7,526,311 B2 | 4/2009 | Someya et al. | 455/550.1 |
| 2006/0049916 A1* | 3/2006 | Kuriki | 340/10.1 |
| 2006/0258289 A1 | 11/2006 | Dua | 455/41.3 |
| 2006/0280149 A1* | 12/2006 | Kuhl et al. | 370/338 |
| 2007/0205865 A1 | 9/2007 | Rofougaran et al. | 340/10.1 |
| 2008/0064346 A1 | 3/2008 | Charrat | 455/131 |
| 2010/0178866 A1* | 7/2010 | Jalkanen | 455/41.1 |

FOREIGN PATENT DOCUMENTS

| | | | |
|---|---|---|---|
| GB | 2 421 663 A | 6/2006 | |
| JP | 2005-108044 A | 4/2005 | |
| JP | 2007-519990 A | 7/2007 | |
| WO | WO 2005/060701 A2 | 7/2005 | |
| WO | WO 2007/122453 * | 11/2007 | 710/63 |
| WO | WO 2008/041652 * | 4/2008 | 455/552.1 |
| WO | WO 2009/123249 A2 | 10/2009 | |

\* cited by examiner

*Primary Examiner* — Ankur Jain
(74) *Attorney, Agent, or Firm* — Fitzpatrick, Cella, Harper & Scinto

(57) ABSTRACT

A communication terminal includes a first communication unit which has a power supply function by electromagnetic induction and writes or reads information in an active or passive mode, and a second communication unit having a communication capability higher than that of the first communication unit. A mode in which the first communication unit is functioning, the active mode or the passive mode, is determined. Communication via the second communication unit is controlled based on the determination result.

18 Claims, 12 Drawing Sheets

COMMUNICATION TERMINAL, COMPUTER-READABLE STORAGE MEDIUM, AND COMMUNICATION METHOD

TECHNICAL FIELD

The present invention relates to a communication terminal, a computer-readable storage medium, and a communication method.

BACKGROUND ART

A communication terminal which performs communication using a non-contact communication method is known. Japanese Patent Laid-Open No. 2005-108044 discloses a technique of communicating with a communication partner terminal by starting up a designated application based on application information and a special command sent from the communication partner terminal during near field non-contact communication.

However, the non-contact communication method described in the reference limits the capacity of data communication. The transmission rate is only about 20 kbps. This is not suitable to communicate mass data. To transmit mass data by wireless communication, another data communication unit using a different communication method is necessary.

Assume that the data communication is done using, for example, a wireless USB-OTG (Universal Serial Bus On The Go) method. This method enables mass data transmission by wireless communication. However, it is sometimes necessary to decide the roles of a host and device of communication terminals. A communication terminal functioning as a device must also decide whether to operate as a USB mass storage class. For example, a digital camera or a cellular phone often has no defined role of host/device and requires role setting.

As described above, it is necessary to set the roles of two terminals at the start of communication. The role setting requires a cumbersome operation and wastes time.

DISCLOSURE OF INVENTION

The present invention enables provides a communication terminal, a computer-readable storage medium, and a communication method, which allow to quickly start communication by making a procedure necessary at the start of communication more simple than before.

According to a first aspect of the present invention, there is provided a communication terminal comprising: first communication means, having a power supply function by electromagnetic induction, for writing or reading information in one of an active mode and a passive mode; second communication means having a communication capability higher than that of the first communication means; determination means for determining a mode in which the first communication means is functioning, the active mode or the passive mode; and communication control means for controlling communication via the second communication means based on a determination result of the determination means.

According to a second aspect of the present invention, there is provided a computer-readable storage medium storing a computer program, the computer program causing a computer incorporated in a communication terminal including first communication means, having a power supply function by electromagnetic induction, for writing or reading information in one of an active mode and a passive mode, and second communication means having a communication capability higher than that of the first communication means to function as: determination means for determining a mode in which the first communication means is functioning, the active mode or the passive mode; and communication control means for controlling communication via the second communication means based on a determination result of the determination means.

According to a third aspect of the present invention, there is provided a communication method in a communication terminal including first communication means, having a power supply function by electromagnetic induction, for writing or reading information in one of an active mode and a passive mode, and second communication means having a communication capability higher than that of the first communication means, comprising: a determination step of determining a mode in which the first communication means is functioning, the active mode or the passive mode; and a communication control step of controlling communication via the second communication means based on a result of the determination.

Further features of the present invention will become apparent from the following description of exemplary embodiments with reference to the attached drawings.

BEST MODE FOR CARRYING OUT THE INVENTION

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

(First Embodiment)

Figure 1:
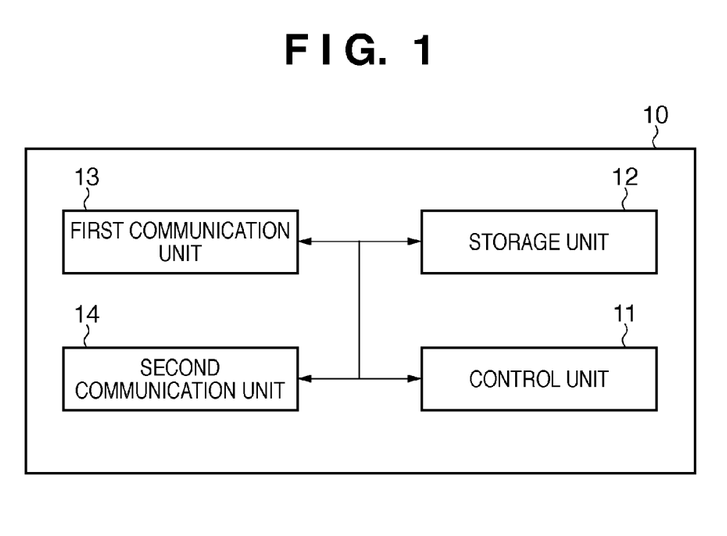
FIG. 1 is a block diagram showing an example of the arrangement of a communication terminal according to an embodiment the present invention.

FIG. 1 is a block diagram showing an example of the arrangement of a communication terminal according to an embodiment the present invention.

A communication terminal 10 includes a control unit 11, storage unit 12, first communication unit 13, and second communication unit 14.

The control unit 11 includes, for example, a CPU (Central Processing Unit) and comprehensively controls the entire communication terminal 10 (e.g., controls communication). The storage unit 12 includes, for example, a memory and stores programs and data. The first communication unit 13 is a non-contact communication interface including, for example, an RFID (Radio Frequency IDentification) reader/writer and having a power supply function by electromagnetic induction. The second communication unit 14 is a communication (e.g., NFC (Near Field Communication) standard) interface which adopts a communication scheme different from that of the first communication unit 13. Note that the second communication unit 14 need only be a communication interface having a communication capability higher than that of the first communication unit 13 (the second communication unit 14 enables at least one of mass data communication and high-speed data communication). For example, a communication scheme such as USB-OTG is usable. In communication between communication terminals using the second communication unit 14, one of the terminals functions as a host or a device.

An example of the arrangement of the communication terminal 10 has been described above. The communication terminal 10 is not limited to the above-described arrangement and may additionally include functions of, for example, a storage device, input device, and output device as needed.

Figure 2A:
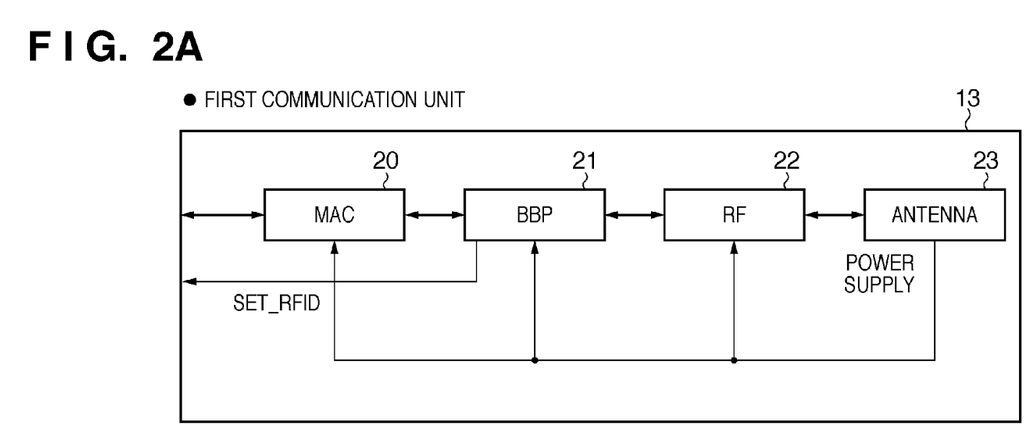
FIGS. 2A and 2B are block diagrams showing examples of the arrangements of a first communication unit 13 and a second communication unit 14 shown in FIG. 1.
Figure 2B:
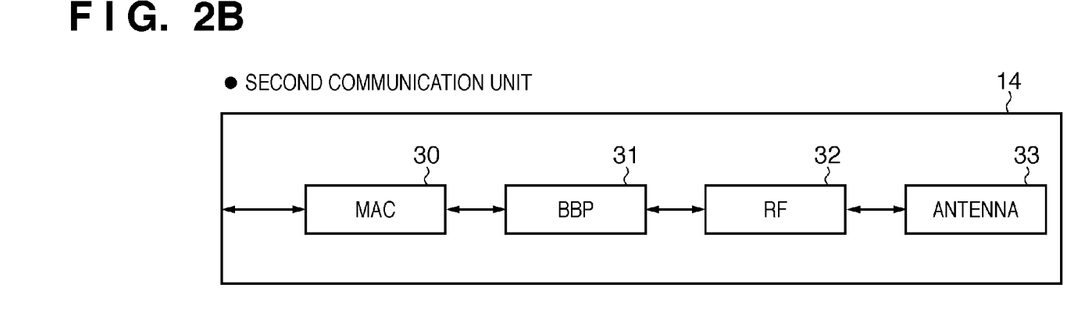

The first communication unit 13 and the second communication unit 14 shown in FIG. 1 will be explained with reference to FIGS. 2A and 2B.

Each of MACs (Medium Access Controllers) 20 and 30 manages a medium access layer. Each of BBPs (Base Band Processors) 21 and 31 has a communication signal processing function such as error correction coding, decoding, and modulation/demodulation. Each of RF (Radio Frequency) blocks 22 and 32 processes a baseband signal in the carrier frequency band. Each of antennas 23 and 33 transmits/receives a modulated signal of the carrier frequency band in a wireless zone.

The first communication unit 13 operates using power supplied by electromagnetic induction from an external device (e.g., another communication terminal) or power supplied from itself (control unit 11). Electromagnetic induction is caused using the antenna 23. If the first communication unit 13 operates using only power supplied by electromagnetic induction, the transmission speed is expected to be lower. Hence, the first communication unit 13 may operate using even power supplied from itself as needed.

When operating by power externally supplied by electromagnetic induction, the first communication unit 13 functions as a storage (also called an RFID or a tag) to passively write or read data. When operating by power supplied from itself, the first communication unit 13 functions as a reader/writer to actively write or read data. The first communication unit 13 has a signal output SET_RFID to set the BBP 21 to a storage or reader/writer. When the output level is L (low level), the first communication unit 13 functions as a storage. When the output level is H (high level), the first communication unit 13 functions as a reader/writer. The control unit 11 causes the communication terminal 10 to function as a host or a device (a device is controlled by a host) based on the output result of the signal SET_RFID, as will be described later in detail. The communication terminal 10 thus performs communication using the second communication unit 14 in one of the communication modes.

Figure 3:
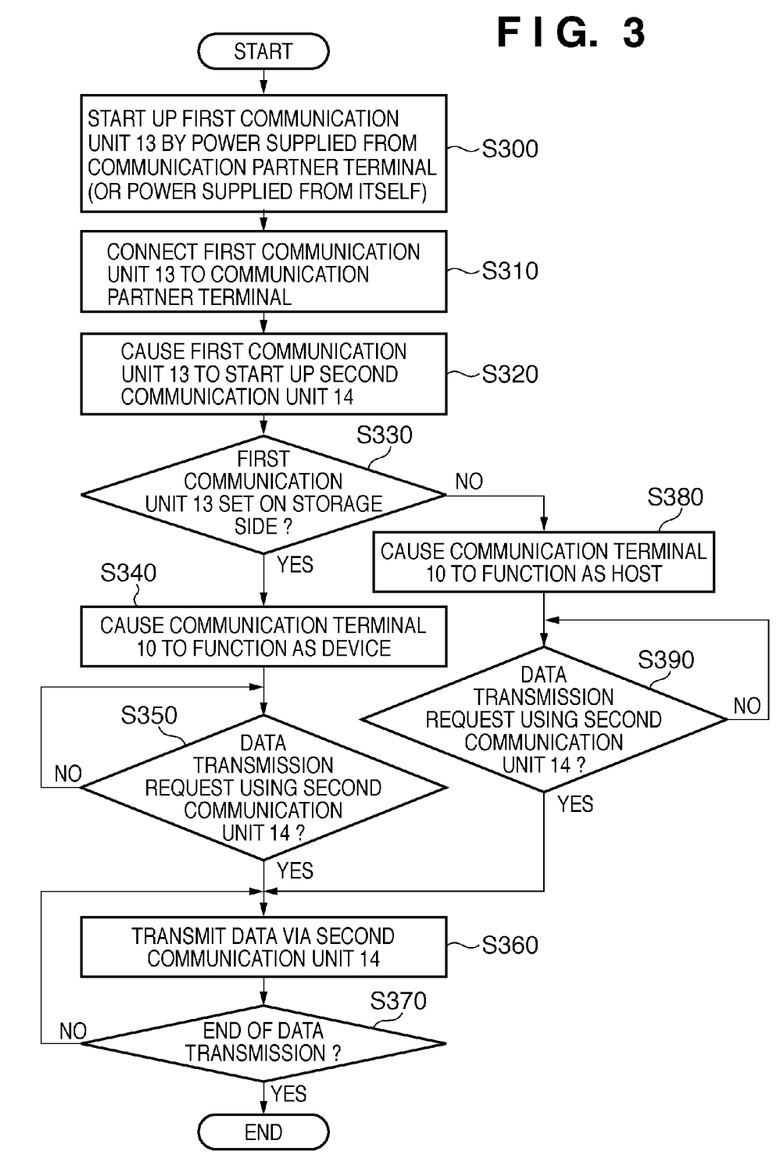
FIG. 3 is a flowchart illustrating an example of the operation of the communication terminal 10 shown in FIG. 1.

An example of the operation of the communication terminal 10 shown in FIG. 1 will be described next with reference to FIG. 3. An example will be described here, in which two communication terminals 10, that is, the communication terminal 10 and another communication terminal (communication partner terminal) communicate with each other.

The processing starts when the first communication unit 13 of the communication terminal 10 receives power supplied from another communication terminal (to be referred to as a communication partner terminal hereinafter) and starts up (activate) (S300). The first communication unit 13 is sometimes started up by the control unit 11, as described above. However, the following explanation will be made assuming that the first communication unit 13 starts up upon receiving power from the communication partner terminal.

When the processing starts, the first communication unit 13 is first connected to the communication partner terminal (S310). The connection is done by transmitting device information of the communication terminal 10 to the communication partner terminal.

When the connection is completed, the first communication unit 13 starts up the second communication unit 14. The first communication unit 13 also notifies the control unit 11 that it is started up by the communication partner terminal (S320). This notification is sent using the signal SET_RFID.

The control unit 11 determines based on the output result of the signal SET_RFID whether the first communication unit 13 is set on the storage side or reader/writer side. If the first communication unit 13 is on the storage side (YES in step S330), the control unit 11 causes the communication terminal 10 to function as a device (S340). This allows the communication partner terminal to use the communication terminal 10 as a storage.

Then, the communication terminal 10 causes the control unit 11 to determine whether a data transmission request from the communication partner terminal exists (S350). The data transmission request is received via the second communication unit 14. In this case, the communication terminal 10 transmits data to the communication partner terminal. However, the communication terminal 10 also receives data in some cases, as a matter of course.

If a data transmission request exists (YES in step S350), the control unit 11 transmits data stored in the storage unit 12 to the communication partner terminal via the second communication unit 14 in cooperation with the storage unit 12 (S360). The control unit 11 determines based on a response from the communication partner terminal whether the data transmission has ended. If the data transmission has ended (YES in step S370), the communication terminal 10 ends the processing. If the data transmission still continues (NO in step S370), the communication terminal 10 executes the process in step S360 again.

Upon determining in step S330 that the first communication unit 13 is not set on the storage side, that is, the first communication unit 13 is set on the reader/writer side (NO in step S330), the control unit 11 causes the communication terminal 10 to function as a host (S380). This allows the communication partner terminal to use the communication terminal 10 as a host.

In this case, the control unit 11 determines whether a data transmission request to the communication partner terminal exists (S390). The data transmission request is done based on, for example, a user instruction to the communication terminal 10. In this case, the communication terminal 10 transmits data to the communication partner terminal. However, the communication terminal 10 also receives data in some cases, as described above.

If a data transmission request exists (YES in step S390), the control unit 11 transmits data stored in the storage unit 12 to the communication partner terminal via the second communication unit 14 in cooperation with the storage unit 12 (S360). After that, if the data transmission has ended (YES in step S370), the communication terminal 10 ends the processing.

Figure 4:
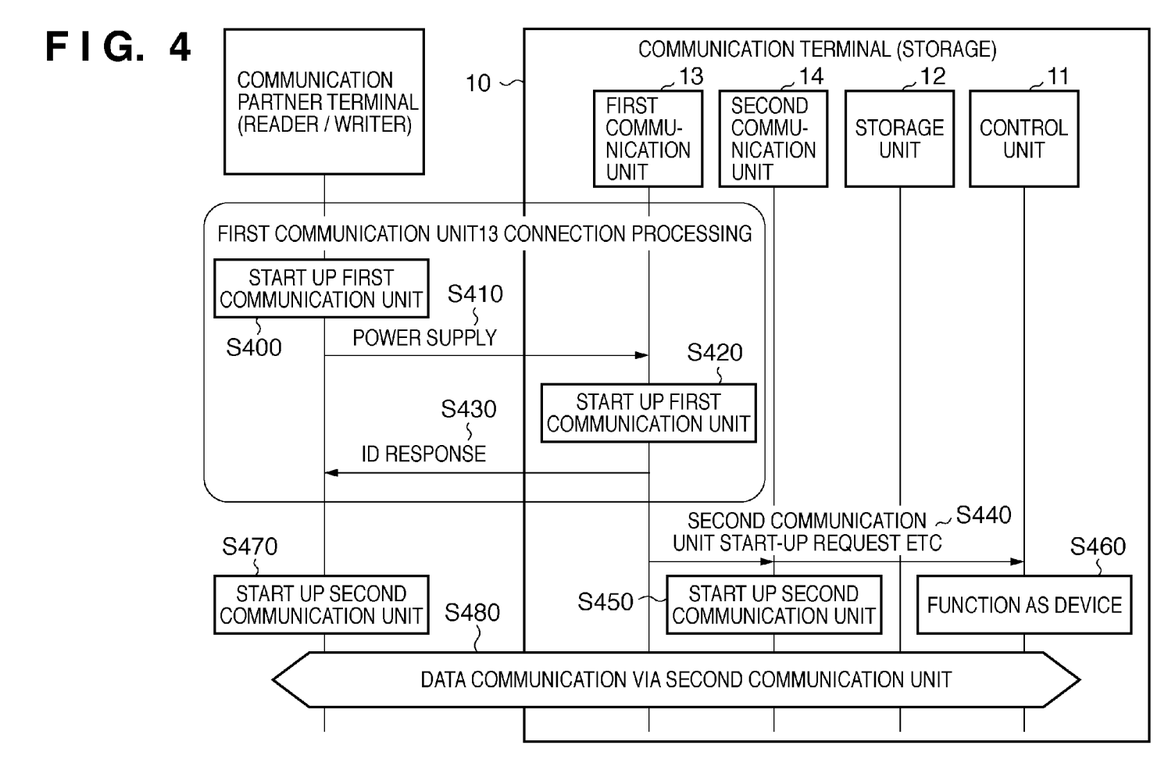
FIG. 4 is a sequence chart showing an example of the sequence of processing of causing the communication terminal 10 shown in FIG. 1 to operate as a device.

An example of the sequence of processing of causing the communication terminal 10 shown in FIG. 1 to operate as a device will be described with reference to FIG. 4. An example will be described here, in which two communication terminals 10, that is, the communication terminal 10 and another communication terminal (communication partner terminal) communicate with each other.

To communicate with the communication terminal 10, the communication partner terminal starts up the first communication unit of its own (S400). The first communication unit 13 of the communication terminal 10 receives power supplied by electromagnetic induction (S410). At this time, the first communication unit 13 of the communication terminal 10 starts up as a storage (S420). The first communication unit 13 of the communication terminal 10 returns, to the communication partner terminal, a response representing that it has started up as a storage, thereby establishing connection to the communication partner terminal (S430).

The first communication unit 13 of the communication terminal 10 requests the second communication unit 14 to start up, and notifies the control unit 11 that the first communication unit 13 has started up as a storage (S440). This notification is sent using the signal SET_RFID, as described above. For example, when the first communication unit 13 has started up as a storage, the output level of the signal SET_RFID changes to L (low level).

In response to the start-up request, the second communication unit 14 of the communication terminal 10 starts up (S450). The control unit 11 causes the communication terminal 10 to function as a device based on the output result of the signal SET_RFID (S460). Next, the communication partner terminal starts up the second communication unit of its own (S470). Then, the communication terminal 10 and the communication partner terminal perform data communication (S480).

Figure 5:
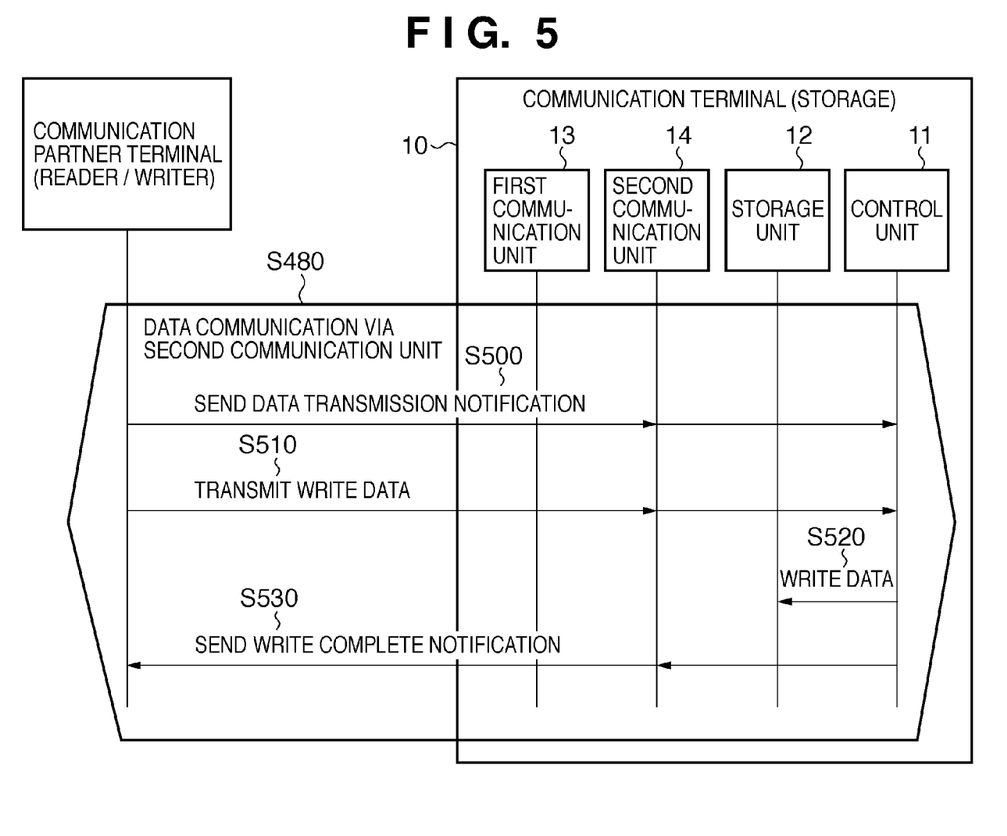
FIG. 5 is a first sequence chart showing an example of the sequence of data communication processing in step S480 of FIG. 4.
Figure 6:
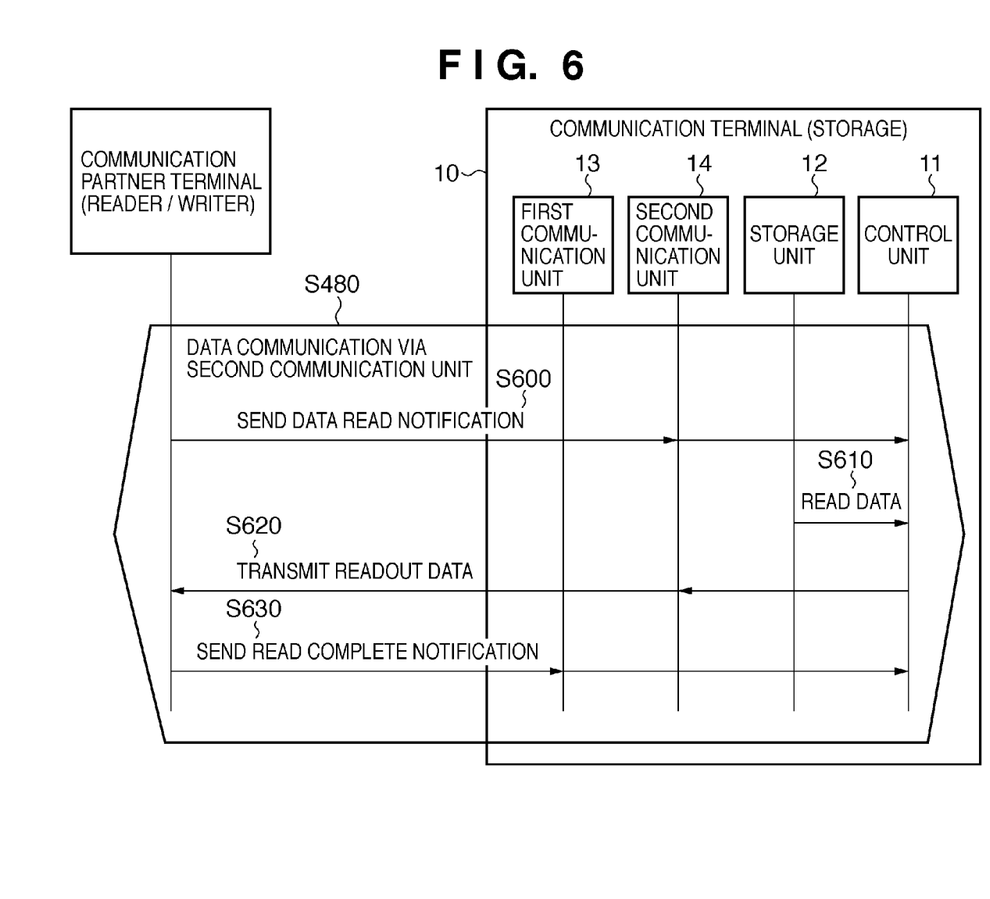
FIG. 6 is a second sequence chart showing an example of the sequence of data communication processing in step S480 of FIG. 4.

The data communication processing in step S480 of FIG. 4 will be described with reference to FIGS. 5 and 6.

First, an example of the sequence of processing of causing the communication partner terminal to write data (data write) in the communication terminal 10 will be explained with reference to FIG. 5.

The communication partner terminal notifies the control unit 11 of the communication terminal 10 that data write will be performed (S500). This notification is sent via the second communication unit 14. The communication partner terminal transmits write data (S510). The communication terminal 10 receives the write data via the second communication unit 14, and causes the control unit 11 to write the data in the storage unit 12 (S520). When the data write has ended, the communication terminal 10 returns a response (write complete) to the communication partner terminal via the second communication unit 14 (S530).

Next, an example of the sequence of processing of causing the communication partner terminal to read data (data read) from the communication terminal 10 will be explained with reference to FIG. 6.

The communication partner terminal notifies the control unit 11 of the communication terminal 10 that data read will be performed (S600). This notification is sent via the second communication unit 14. The communication terminal 10 causes the control unit 11 to read out data from the storage unit 12 (S610), and transmits the readout data to the communication partner terminal via the second communication unit 14 (S620). When reception of the readout data has ended, the communication partner terminal returns a response (read complete) to the control unit 11 of the communication terminal 10 (S630).

Figure 7:
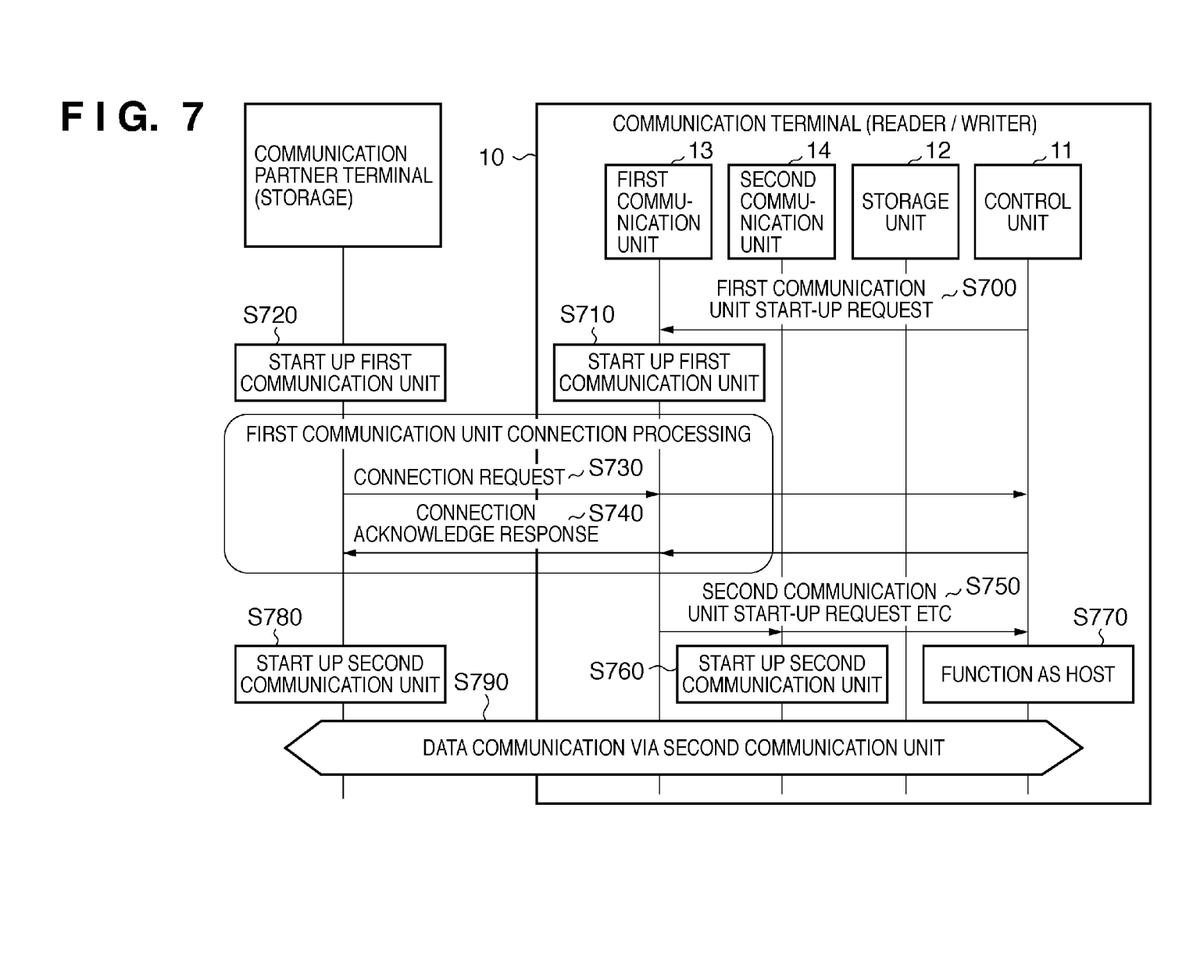
FIG. 7 is a sequence chart showing an example of the sequence of processing of causing the communication terminal 10 shown in FIG. 1 to operate as a host.

An example of the sequence of processing of causing the communication terminal 10 shown in FIG. 1 to operate as a host will be described next with reference to FIG. 7.

The communication terminal 10 causes the control unit 11 to transmit a start-up request to the first communication unit 13 (S700). The first communication unit 13 starts up using power from itself (3710). At this time, the first communication unit 13 of the communication terminal 10 starts up as a reader/writer.

To communicate with the communication terminal 10, the communication partner terminal starts up the first communication unit of its own (S720). The first communication unit of the communication partner terminal transmits a connection request to the communication terminal 10 (S730). The communication terminal 10 receives the connection request via the first communication unit 13. To acknowledge connection, the communication terminal 10 returns a connection acknowledge response to the communication partner terminal via the first communication unit 13, thereby establishing connection to the communication partner terminal (S740).

The first communication unit 13 of the communication terminal 10 requests the second communication unit 14 to start up, and notifies the control unit 11 that the first communication unit 13 has started up as a reader/writer (S750). This notification is sent using the signal SET_RFID, as described above. For example, when the first communication unit 13 has started up as a reader/writer, the output level of the signal SET_RFID changes to H (high level).

In response to the start-up request, the second communication unit 14 of the communication terminal 10 starts up (S760). The control unit 11 causes the communication terminal 10 to function as a host based on the output result of the signal SET_RFID (S770). Next, the communication partner terminal starts up the second communication unit of its own (S780). Then, the communication terminal 10 and the communication partner terminal perform data communication (S790).

Figure 8:
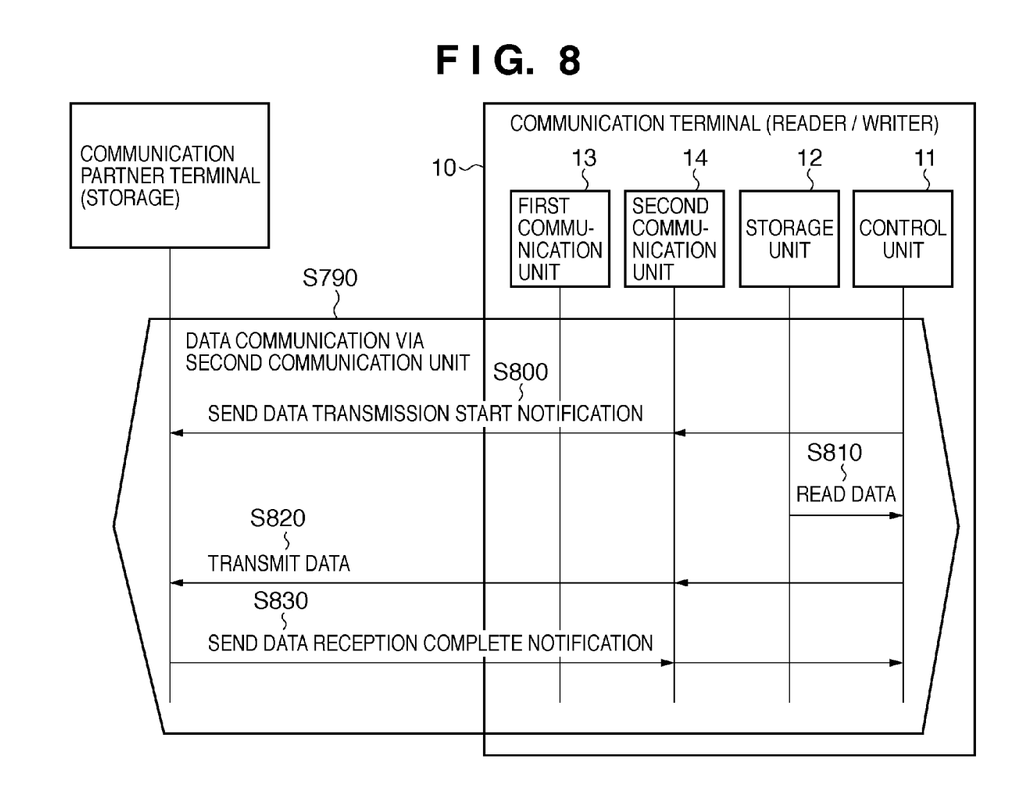
FIG. 8 is a first sequence chart showing an example of the sequence of data communication processing in step S790 of FIG. 7.
Figure 9:
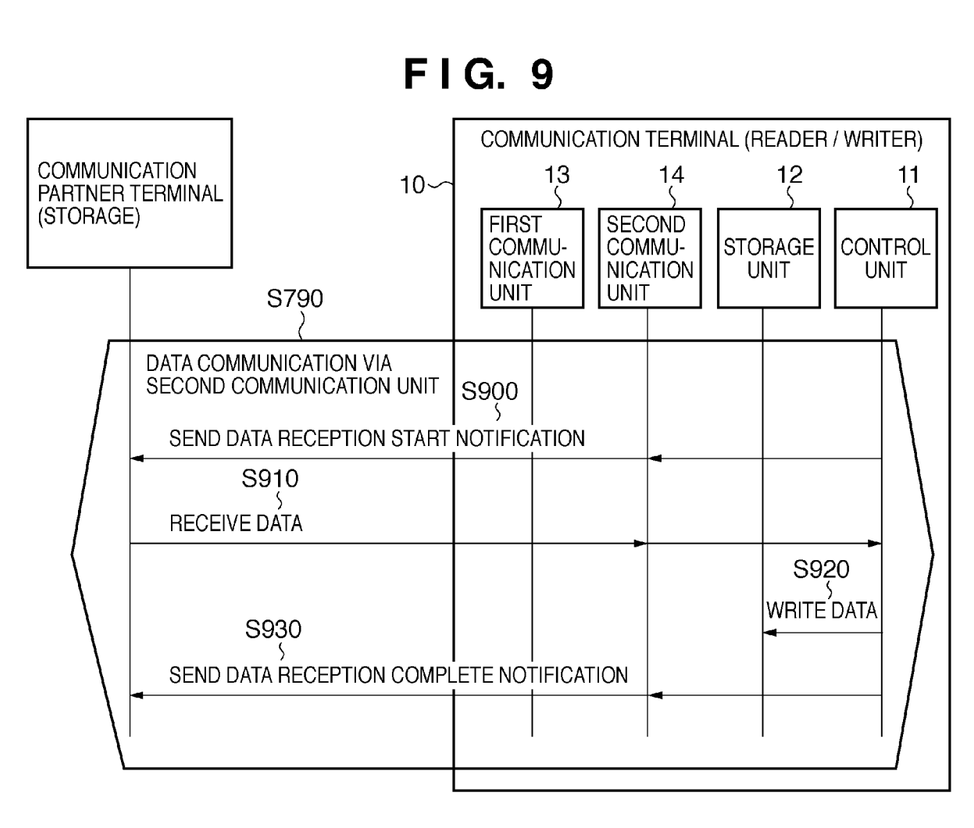
FIG. 9 is a second sequence chart showing an example of the sequence of data communication processing in step S790 of FIG. 7.

The data communication processing in step S790 of FIG. 7 will be described with reference to FIGS. 8 and 9. First, an example of the sequence of processing of causing the communication terminal 10 to transmit data to the communication partner terminal will be explained with reference to FIG. 8.

The communication terminal 10 causes the control unit 11 to notify the communication partner terminal that data transmission will be performed (S800). This notification is sent via the second communication unit 14. The communication terminal 10 causes the control unit 11 to read out data from the storage unit 12 (S810), and transmits the readout data to the communication partner terminal via the second communication unit 14 (S820). When the communication partner terminal has received all data, the communication terminal 10 receives a response (data reception complete) from the communication partner terminal via the second communication unit 14 (S830).

Next, an example of the sequence of processing of causing the communication terminal 10 to receive data from the communication partner terminal will be explained with reference to FIG. 9.

The communication terminal 10 causes the control unit 11 to notify the communication partner terminal that data reception will be performed (S900). This notification is sent via the second communication unit 14. The communication partner terminal transmits data via the second communication unit (S910). The communication terminal 10 receives the data via the second communication unit 14, and causes the control unit 11 to write the data in the storage unit 12 (S920). When the data reception has ended, the communication terminal 10 notifies the communication partner terminal of a response (data reception complete) via the second communication unit 14 (S930).

As described above, according to the first embodiment, the communication mode of the communication terminal 10 using the second communication unit 14 is decided depending on whether the first communication unit 13 is functioning as a reader/writer or a storage. This makes a procedure (e.g., communication mode decision) necessary at the start of communication via the second communication unit 14 more simple than before. It is therefore possible to quickly start communication via the second communication unit 14.

(Second Embodiment)

The second embodiment will be described next. A communication terminal of the second embodiment has the same arrangement as in FIGS. 1, 2A and 2B described in the first embodiment, and a description thereof will not be repeated.

Figure 10:
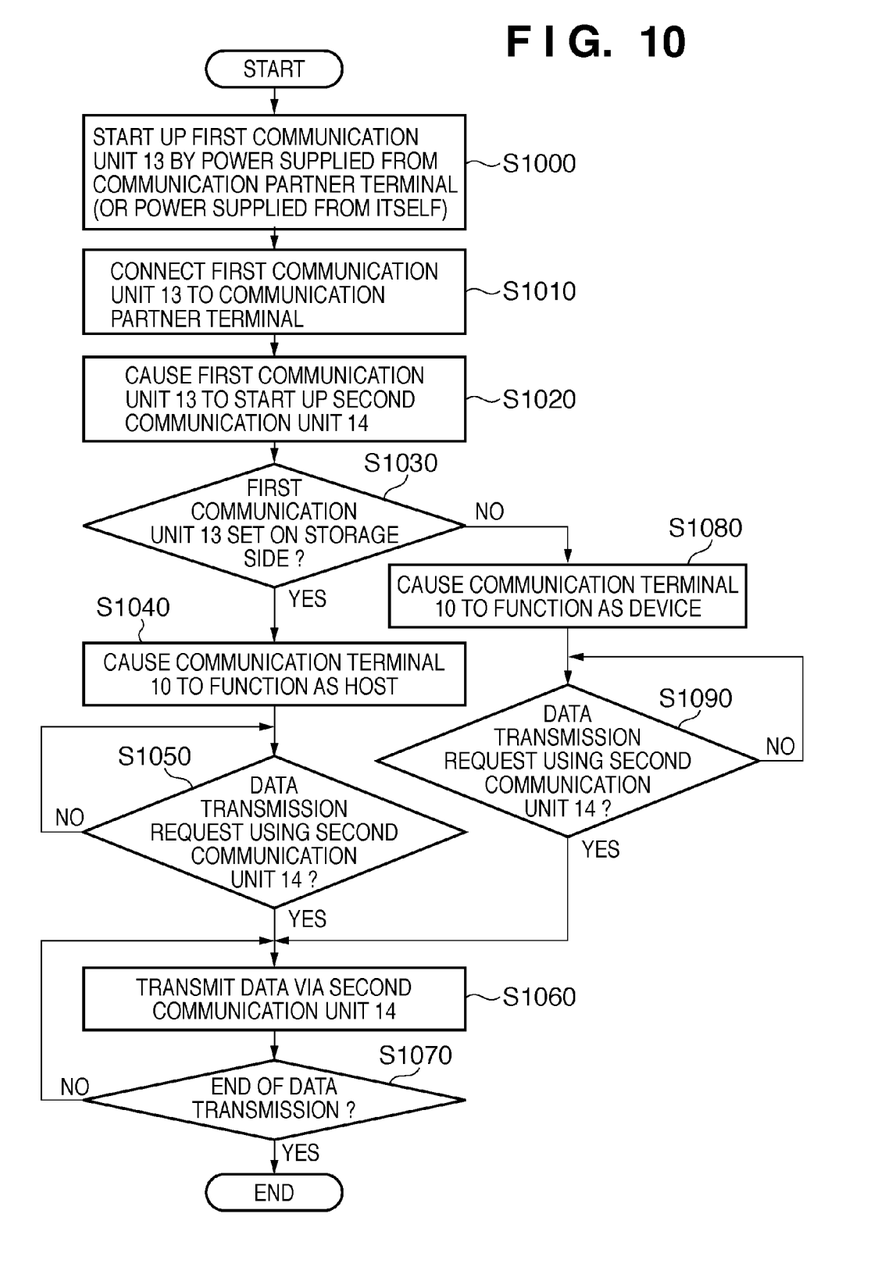
FIG. 10 is a flowchart illustrating an example of the operation of a communication terminal 10 according to the second embodiment.

An example of the operation of a communication terminal 10 according to the second embodiment will be described with reference to FIG. 10. Only processing different from FIG. 3 of the first embodiment will be explained. The different points are the processes in steps S1040 and S1080.

In step S1040, the communication terminal 10 functions as a host although a first communication unit 13 is set on the storage side, unlike the first embodiment. In step S1080, the communication terminal 10 functions as a device although the first communication unit 13 is set on the reader/writer side, unlike the first embodiment.

Figure 11:
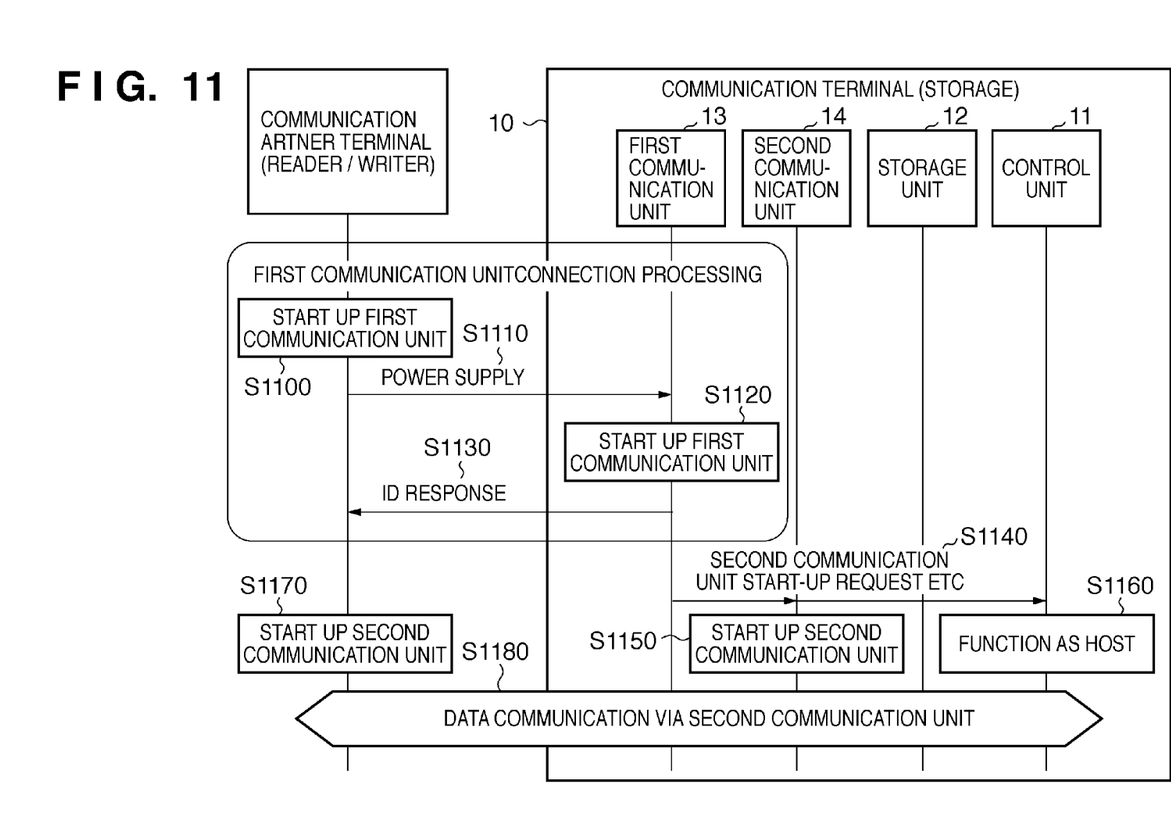
FIG. 11 is a sequence chart showing an example of the sequence of processing of causing the communication terminal 10 shown in FIG. 10 to operate as a host.

An example of the sequence of processing of causing the communication terminal 10 of the second embodiment to operate as a host will be described next with reference to FIG. 11. Only processing different from FIG. 4 of the first embodiment will be explained. The different point is the process in step S1160. More specifically, as in FIG. 10, even when the first communication unit 13 is set on the storage side, the communication terminal 10 functions as a host. The sequence of data communication in step S1180 is the same as in FIGS. 8 and 9 of the first embodiment, and a description thereof will not be repeated.

Figure 12:
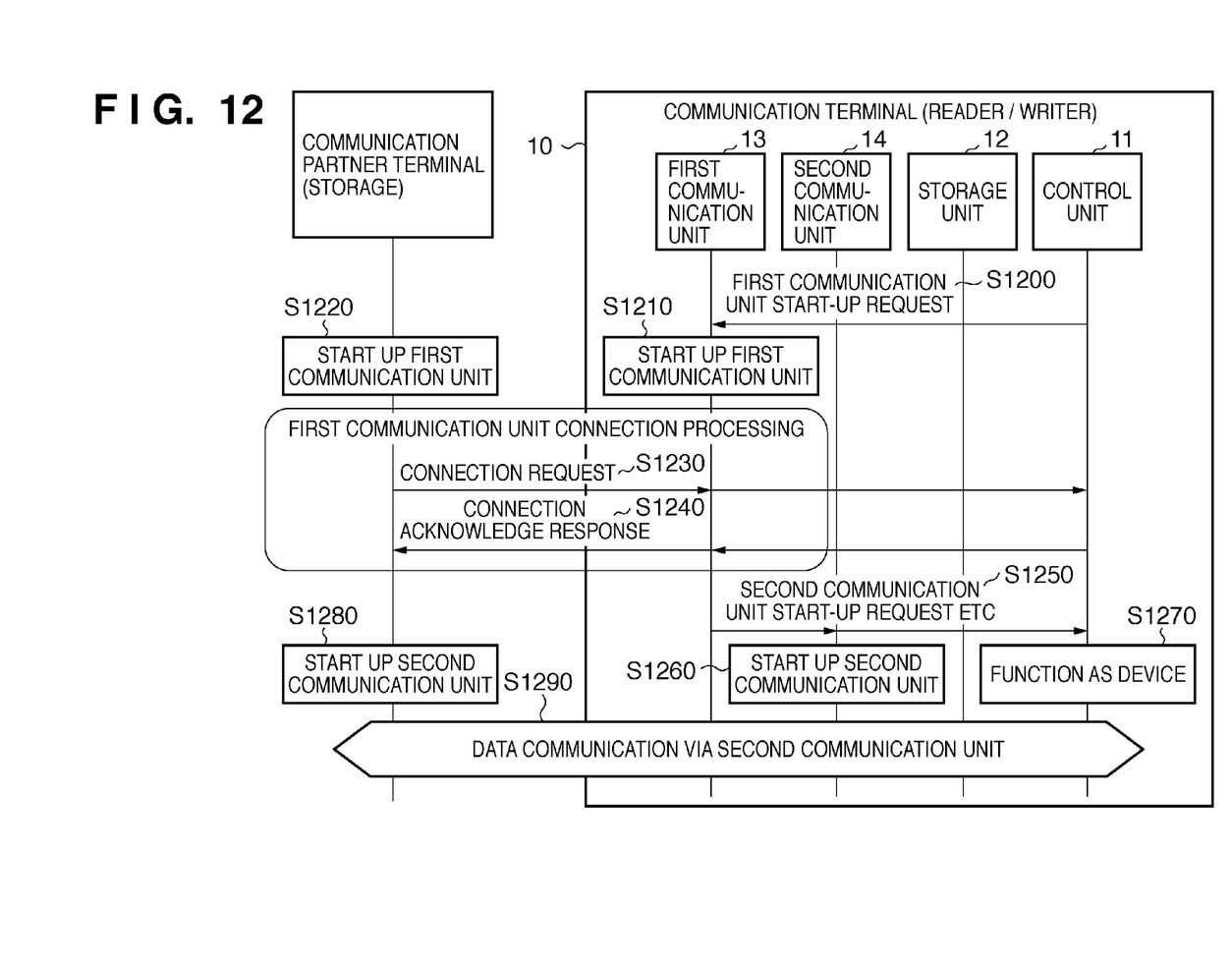
FIG. 12 is a sequence chart showing an example of the sequence of processing of causing the communication terminal 10 shown in FIG. 10 to operate as a device.

An example of the sequence of processing of causing the communication terminal 10 of the second embodiment to operate as a device will be described next with reference to FIG. 12. Only processing different from FIG. 7 of the first embodiment will be explained. The different point is the process in step S1270. More specifically, as in FIG. 10, even when the first communication unit 13 is set on the reader/writer side, the communication terminal 10 functions as a device. The sequence of data communication in step S1290 is the same as in FIGS. 5 and 6 of the first embodiment, and a description thereof will not be repeated.

As described above, according to the second embodiment, it is possible to flexibly decide the communication mode of the communication terminal 10 in accordance with the function (reader/writer side or storage side) of the first communication unit 13, in addition to the effects obtained in the first embodiment.

Typical embodiments of the present invention have been described above. However, the present invention is not limited to the aforementioned and illustrated embodiments, and can be properly modified without departing from the scope of the invention.

The present invention can adopt embodiments in the forms of, for example, a system, apparatus, method, program, and storage medium. The present invention may be applied to either a system constituted by a plurality of devices, or an apparatus consisting of a single device.

The present invention includes a case wherein the functions of the aforementioned embodiments are achieved when a software program is directly or remotely supplied to a system or apparatus, and a computer incorporated in that system or apparatus reads out and executes the supplied program codes. The program to be supplied in this case is a computer program corresponding to the illustrated flowcharts in the embodiments.

Therefore, the program codes themselves installed in a computer to implement the functional processing of the present invention using the computer also implement the present invention. That is, the present invention includes the computer program itself for implementing the functional processing of the present invention. In this case, the form of program is not particularly limited, and an object code, a program to be executed by an interpreter, script data to be supplied to an OS (Operating System), and the like may be used as long as they have the functions of the program.

As a computer-readable storage medium for supplying the computer program, the following media can be used. For example, a Floppy® disk, hard disk, optical disk, magneto-optical disk, MO, CD-ROM, CD-R, CD-RW, magnetic tape, nonvolatile memory card, ROM, and DVD (DVD-ROM, DVD-R) can be used.

As another program supply method, the user establishes connection to a website on the Internet using a browser on a client computer, and downloads the computer program of the present invention from the website onto a recording medium such as a hard disk. In this case, the program to be downloaded may be a compressed file including an automatic installation function. Also, program codes that form the program of the present invention may be segmented into a plurality of files, which may be downloaded from different websites. That is, the present invention includes a WWW server, which makes a plurality of users download program files required to implement the functional processing of the present invention on their computers.

Also, a storage medium such as a CD-ROM, which stores the encrypted program of the present invention, may be delivered to the user. In this case, the user who has cleared a predetermined condition may be allowed to download key information used to decrypt the encrypted program from a website via the Internet. The user executes the encrypted program using that key information to install the program in a computer.

The functions of the aforementioned embodiments can be implemented when the computer executes the readout program. In addition, the functions of the aforementioned embodiments may be implemented in collaboration with an OS or the like running on the computer based on an instruction of that program. In this case, the OS or the like executes some or all of actual processes, which implement the functions of the aforementioned embodiments.

Furthermore, some or all of the functions of the aforementioned embodiments may be implemented when the program read out from the recording medium is written in a memory equipped on a function expansion board or a function expansion unit, which is inserted into or connected to the computer. In this case, after the program is written in the function expansion board or unit, a CPU or the like equipped on the function expansion board or unit executes some or all of actual processes based on an instruction of that program.

According to the present invention, it is possible to quickly start communication by making a procedure necessary at the start of communication more simple than before.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-098751 filed on Apr. 4, 2008, which is hereby incorporated by reference herein in its entirety.

The invention claimed is:

1. A communication terminal, comprising: a first communication unit that communicates wirelessly in a passive mode in which the first communication unit communicates by receiving power from an external apparatus, or an active mode in which the first communication unit communicates by providing power; a second communication unit that communicates wirelessly as a control apparatus or as a controlled apparatus; determining the mode of the first communication unit connecting to an other communication apparatus; and activating the second communication unit as either the control apparatus or the controlled apparatus in a case where the first communication unit operated in the passive mode connected with the other communication apparatus, and activates the second communication unit as either the control apparatus or the controlled apparatus in a case where the first communication unit operated in the active mode connected with the other communication apparatus so that the second communication unit is activated differently from an activated one in the case where the first communication unit operated in the passive mode connected with the other communication apparatus, wherein the second communication unit starts a communication with the other communication apparatus operated as the controlled apparatus in a case where the the second communication unit is activated as the control apparatus, and starts a communication with the other communication apparatus operated as the control apparatus in a case where the the second communication unit is activated as the controlled apparatus.

2. The communication terminal according to claim 1, determines whether the first communication unit is functioning as a reader/writer unit that reads or writes information or as a storage unit that stores information that is written or read.

3. The communication terminal according to claim 1, wherein activating, in the case where the first communication unit operates in the active mode, the second communication unit as the controlled apparatus, and activating, in the case where the first communication unit operates in the passive mode, the second communication unit as the control apparatus.

4. The communication terminal according to claim 1, wherein the first communication unit performs communication using Radio Frequency Identification.

5. The communication terminal according to claim 1, wherein the second communication unit performs communication using Universal Serial Bus On The Go.

6. The communication terminal according to claim 1, wherein the first communication unit outputs a signal related to a determination result to the other communication apparatus.

7. The communication terminal, according to claim 1, wherein the control apparatus comprises a host function.

8. The communication terminal according to claim 1, wherein activating, in the case where the first communication unit operates in the active mode, the second communication unit as the control apparatus, and activating, in the case where the first communication unit operates in the passive mode, the second communication unit as the controlled apparatus.

9. A non-transitory computer-readable storage medium storing a computer program that, when executed, causes a computer to perform a method, the computer being incorporated in a communication terminal including a first communication unit that communicates wirelessly in a passive mode in which the first communication unit communicates by receiving power from an external apparatus, or an active mode in which the first communication unit communicates by providing power, and a second communication unit that communicates wirelessly as a control apparatus or as a controlled apparatus, comprising:
determining a mode of the first communication unit connecting to an other communication apparatus; and activating the second communication unit as either the control apparatus or the controlled apparatus in the case where the first communication unit operated in the passive mode connected with the other communication apparatus, and activating the second communication unit as either the control apparatus or the controlled apparatus in a case where the first communication unit operated in the active mode connected with the other communication apparatus so that the second communication unit is activated differently from an activated one in the case where the first communication unit operated in the passive mode connected with the other communication apparatus, wherein the second communication unit starts a communication with the other communication apparatus operated as the controlled apparatus in a case where the second communication unit is activated as the control apparatus, and starts a communication with the other communication apparatus operated as the control apparatus in a case where the second communication unit is activated as the controlled apparatus.

10. A communication method performed by a communication terminal including a first communication unit that communicates wirelessly in a passive mode in which the first communication unit communicates by receiving power from an external apparatus, or an active mode in which the first communication unit communicates by providing power, and a second communication unit that communicates wirelessly as a control apparatus or as a controlled apparatus, comprising the steps of: determining a mode of the first communication unit connecting to an other communication apparatus; and activating the second communication unit as either the control apparatus or the controlled apparatus in the case where the first communication unit operated in the passive mode connected with the other communication apparatus, and activating the second communication unit as either the control apparatus or the controlled apparatus in a case where the first communication unit operated in the active mode connected with the other communication apparatus so that the second communication unit is activated differently from an activated one in the case where the first communication unit operated in the passive mode connected with the other communication apparatus, wherein the second communication unit starts a communication with the other communication apparatus operated as the controlled apparatus in a case where the second communication unit is activated as the control apparatus, and starts a communication with the other communication apparatus operated as the control apparatus in a case where the second communication unit is activated as the controlled apparatus.

11. A communication terminal, comprising: a first communication unit that communicates wirelessly in a first mode in which the first communication unit writes information or reads out information, or a second mode in which another apparatus writes information in the first communication unit or reads out information from the first communication unit; a second communication unit that communicates wirelessly as a control apparatus or as a controlled apparatus; and activating the second communication unit as either the control apparatus or the controlled apparatus in a case where the first communication unit operated in the first mode connected with a communication partner apparatus, and activates the second communication unit as either the control apparatus or the controlled apparatus in a case where the first communication unit operated in the second mode connected with the communication partner apparatus so that the second communication unit is activated differently from an activated one in the case where the first communication unit operated in the first mode connected with the communication partner apparatus, wherein the second communication unit starts a communication with the communication partner apparatus in accordance with an activation.

12. The communication terminal according to claim 11, wherein the second communication unit is activated as the control apparatus in a case where the first communication unit operated in the first mode connected with a communication partner apparatus.

13. The communication terminal according to claim 11, wherein the second communication unit is activated as the controlled apparatus in a case where the first communication unit operated in the first mode connected with a communication partner apparatus.

14. The communication terminal according to claim 11, wherein the second communication unit operating as the control apparatus, which controls a partner apparatus via wireless communication, and as a controlled apparatus controlled by the partner apparatus via wireless communication.

15. The communication terminal according to claim 11, wherein the first communication unit and the second communication unit communicate wirelessly.

16. The communication terminal according to claim 11, the first communication unit comprises a contactless communication unit.

17. A control method of a communication apparatus, comprising the steps of: communicating by a first communication unit that communicates wirelessly in a first mode in which the first communication unit writes information or reads out information, or a second mode in which another apparatus writes information in the first communication unit or reads out information from the first communication unit; and activating a second communication unit as either a control apparatus or a controlled apparatus in a case where the first communication unit operated in the first mode connected with a communication partner apparatus, and activating the second communication unit as either the control apparatus or the controlled apparatus in a case where the first communication unit operated in the second mode connected with the communication partner apparatus so that the second communication unit is activated differently from an activated one in the case where the first communication unit operated in the first mode connected with the communication partner apparatus, wherein the second communication unit starts a wireless communication with the communication partner apparatus in accordance with an activation.

18. A non-transitory computer-readable storage medium storing a computer program that, when executed, causes a computer to perform a method, the computer being incorporated in a communication apparatus, the method comprising the steps of: communicating by a first communication unit that communicates wirelessly in a first mode in which the first communication unit writes information or reads out information, or a second mode in which another apparatus writes information in the first communication unit or reads out information from the first communication unit; and activating a second communication unit as either a control apparatus or a controlled apparatus in a case where the first communication unit operated in the first mode connected with a communication partner apparatus, and activating the second communication unit as either the control apparatus or the controlled apparatus in a case where the first communication unit operated in the second mode connected with the communication partner apparatus so that the second communication unit is activated differently from an activated one in the case where the first communication unit operated in the first mode connected with the communication partner apparatus, wherein the second communication unit starts a wireless communication with the communication partner apparatus in accordance with an activation.

* * * * *